US009104475B2

(12) United States Patent
Sule et al.

(10) Patent No.: US 9,104,475 B2
(45) Date of Patent: Aug. 11, 2015

(54) METHODS AND APPARATUS FOR MANAGING OPERATIONS OF A WEB BROWSER BY PREDICTING TIME PERIOD OF SUBSEQUENT SCRIPT EXECUTION ACTIVITY

(75) Inventors: Dineel D. Sule, San Diego, CA (US); Subrato K. De, San Diego, CA (US); Mark Bapst, South Barrington, IL (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 839 days.

(21) Appl. No.: 13/081,765

(22) Filed: Apr. 7, 2011

(65) Prior Publication Data
US 2012/0260181 A1 Oct. 11, 2012

(51) Int. Cl.
*G06F 3/01* (2006.01)
*G06F 15/16* (2006.01)
*G06F 9/48* (2006.01)
*G06F 17/30* (2006.01)
*G06F 11/34* (2006.01)

(52) U.S. Cl.
CPC ........ *G06F 9/4843* (2013.01); *G06F 17/30899* (2013.01); *G06F 11/3409* (2013.01); *G06F 2209/5019* (2013.01)

(58) Field of Classification Search
CPC .......... G06F 17/30899; G06F 17/3089; G06F 17/30902; G06F 17/30905; G06F 17/30861; G06F 9/4843; G06F 11/3409; G06F 11/3414
USPC .................. 718/100; 709/217, 218, 224, 203; 707/E17.116; 714/E11.192, E11.193; 715/736
See application file for complete search history.

(56) References Cited

U.S. PATENT DOCUMENTS

| 6,360,273 | B1 | 3/2002 | Beurket et al. |
| 6,961,901 | B1 | 11/2005 | Colson |
| 7,228,500 | B2 | 6/2007 | Calvert et al. |
| 7,765,248 | B2 * | 7/2010 | Kanasaki ...................... 709/203 |
| 2002/0194211 | A1 | 12/2002 | Subramanian et al. |

(Continued)

OTHER PUBLICATIONS

Fisher Darin , "Link Prefetching FAQ" Webpage located at developer.mozilla.org/en-US/docs/Link_prefetching_FAQ downloaded Jan. 4, 2013, Mar. 3, 2003, Publisher: Mozilla Published in: US, p. 4.

(Continued)

*Primary Examiner* — Meng An
*Assistant Examiner* — Abu Ghaffari
(74) *Attorney, Agent, or Firm* — Neugeboren O'Dowd PC

(57) ABSTRACT

A computing device and methods of operating the same are disclosed. The computing device may include a network interface that receives web content and a display that displays a displayable format of the web content. In addition, a plurality of browser processing components are included that carry out browser processing activity to generate a displayable format of the web content, and the computing device includes a browser management component that monitors at least one browser processing activity of a corresponding browser processing component and coordinates at least one browser management activity to either reduce the likelihood that the at least one browser management activity adversely affects performance of the plurality of browser processing components, or allow the at least one browser management activity to perform activities that leads to overall improvement of the browsing experience.

20 Claims, 10 Drawing Sheets

(56) References Cited

U.S. PATENT DOCUMENTS

| | | | |
|---|---|---|---|
| 2003/0084265 A1* | 5/2003 | Heller et al. | 711/170 |
| 2003/0236771 A1 | 12/2003 | Becker | |
| 2006/0184869 A1* | 8/2006 | Tiffany | 715/501.1 |
| 2007/0118796 A1 | 5/2007 | Nazem et al. | |
| 2007/0143561 A1* | 6/2007 | Gorobets | 711/170 |
| 2007/0162498 A1* | 7/2007 | Mishra | 707/104.1 |
| 2008/0133517 A1* | 6/2008 | Kapoor et al. | 707/6 |
| 2010/0023582 A1* | 1/2010 | Pedersen et al. | 709/203 |
| 2010/0115388 A1 | 5/2010 | Nguyen | |
| 2010/0145973 A1* | 6/2010 | Kim et al. | 707/759 |
| 2010/0262780 A1 | 10/2010 | Mahan et al. | |
| 2010/0293206 A1 | 11/2010 | Ylonen | |
| 2011/0131341 A1 | 6/2011 | Yoo et al. | |
| 2011/0219035 A1* | 9/2011 | Korsunsky et al. | 707/784 |
| 2011/0239200 A1 | 9/2011 | Binsztok | |
| 2012/0066586 A1 | 3/2012 | Shemesh | |
| 2012/0221930 A1 | 8/2012 | Nguyen | |
| 2012/0226972 A1 | 9/2012 | Fainberg et al. | |
| 2012/0272132 A1 | 10/2012 | Mondal et al. | |
| 2012/0297291 A1 | 11/2012 | Fainberg et al. | |
| 2013/0036295 A1* | 2/2013 | Jiva et al. | 712/220 |

OTHER PUBLICATIONS

"Optimize Caching" webpage located at developers.google.com/speed/docs/best-practices/caching downloaded on Jan. 4, 2013, Mar. 28, 2012, Publisher: Google Published in: US, p. 6.

Souders, Steve, "Call to Improve Browser Caching" webpage located at stevesouders.com/blog/2010/04/26/call-to-improve-browser-caching/ downloaded Jan. 4, 2013, Apr. 26, 2010, Publisher: Steve Souders, Published in: US, p. 6.

""The Chromium Projects", webpage located at dev.chromium.org/developers/design-documents/dns-prefetching downloaded Dec. 7, 2012, Publisher: Google Sites, Published in: US, p. 4.".

Zhang, Kaimin, et al., "Smart Caching for Web Browsers" downloaded Jan. 4, 2013, Apr. 30, 2010, Publisher: International World Wide Web Conference Committee Published in: US, p. 10.

Ferrandez, Tess, "Background Garbage Collection in CLR 4.0", Webpage located at blogs.msdn.com/b/tess/archive/2009/05/29/background-garbage-collection-in-clr-4-0.aspx downloaded Sep. 20, 2012, Publisher: Microsoft (MSDN), Published in: US, May 29, 2009, pp. 5.

"Garbage Collection in V8; For mobile and beyond", Webpage located at ajaxian.com/archives/garbage-collection-in-v8-for-mobile-and-beyond downloaded Sep. 20, 2012, Publisher: Ajaxian, Published in: US, May 13, 2010, pp. 6.

"Garbage Collection", Webpage located at msdn.microsoft.com/en-us/library/0xy59wtx.aspx downloaded Sep. 20, 2012, Publisher: Microsoft (MSDN) Published in: US, 2012, pp. 2.

"Garbage Collection", Webpage located at developer.palm.com/content/index.php?id=4562 downloaded Sep. 20, 2012, 2011, Publisher: Hewlett-Packard Development Company, L.P., Published in: US, pp. 9.

"Garbage Collection", Webpage located at developer.palm.com/content/resources/develop/garbage_collection.html downloaded Sep. 20, 2012, Publisher: Hewlett-Packard Development Company, L.P., Published in: US, 2011, pp. 9.

Goldshtein, Sasha, "Garbage Collection Notifications in .NET 3.5 SP1", Webpage located at blogs.microsoft.co.il/blogs/sasha/archive/2008/08/25/garbage-collection-notifications-in-net-3-5-sp1.aspx downloaded Sep. 20, 2012, Aug. 25, 2008, pp. 5.

Kero, Martin, et al., "Scheduling Garbage Collection in Real-Time Systems", CODES+ISSS '10, Oct. 24-29, 2010, Scottsdale, Arizona, USA, Publisher: ACM, Published in: US, pp. 10.

Mandelin, David, "JavaScript speedups in Firefox 3.6", Webpage located at hacks.mozilla.org/2010/01/javascript-speedups-in-firefox-3-6/ downloaded Sep. 20, 2012, Publisher: Mozilla, Published in: US, Jan. 13, 2010, pp. 18.

Matura, Digvijay, "Garbage.Collector—4.0" webpage located at dotnetharbour.blogspot.com/2010/05/garbagecollector-40.html, downloaded Sep. 20, 2012, May 14, 2010, pp. 4.

"Parallel and concurrent garbage collectors", Webpage located at chaoticjava.com/posts/parallel-and-concurrent-garbage-collectors/ downloaded Sep. 20, 2012, Published in United States, Jan. 8, 2012, pp. 8.

Stephens, Maoni, "So, what's new in the CLR 4.0 GC?", Webpage located at blogs.msdn.com/b/maoni/archive/2008/11/19/so-what-s-new-in-the-clr-4-0-gc.aspx downloaded Sep. 20, 2012, Nov. 19, 2008, Publisher: Microsoft (MSDN), Published in: US, pp. 8.

Stephens, Maoni, "Using GC Efficiently—Part 1", Webpage located at blogs.msdn.com/b/maoni/archive/2004/06/15/156626.aspx downloaded Sep. 20, 2012, Publisher: Microsoft (MSDN), Published in: US, Jun. 15, 2004, pp. 19.

* cited by examiner

METHODS AND APPARATUS FOR MANAGING OPERATIONS OF A WEB BROWSER BY PREDICTING TIME PERIOD OF SUBSEQUENT SCRIPT EXECUTION ACTIVITY

FIELD OF THE INVENTION

The present invention relates to communication devices. In particular, but not by way of limitation, the present invention relates to communication devices that receive and process web content.

BACKGROUND OF THE INVENTION

With the increasing availability of powerful embedded application processors and the ongoing evolution of the improved operating standards (e.g., HTML5, CSS, JavaScript, and W3C standards), web browsers on mobile devices have gradually become one of the most popular applications. Simultaneously, web browsers have also become unique applications that are complex enough to make efficient execution on mobile devices a difficult challenge.

For example, browsers interact with a large number of software and hardware components (e.g., graphics, multimedia, networking, runtime system, and kernel components) of the embedded platform. This type of interaction with so many different components creates complex problems that need to be addressed to improve the efficiency and performance.

Browsers, for example, typically carry out management activities (e.g., DNS prefetching, speculative resource prefetching, garbage collection by virtual machines (e.g., scripting-language-based engines including JavaScript engines), block memory moves, runtime data collection, runtime profiling, etc.) that enable browser components (e.g., resource loaders, networking components, HTTP engines, virtual machines (e.g., JavaScript engines), HTML parsers, CSS components, painting, and rendering components) to function efficiently and display the web content in a viewable format on the mobile device. These management activities do not involve the direct processing of web content, but are important for the proper and/or enhanced operation of the browser components.

But when a browser management activity (e.g., garbage collection by a virtual machine such as JavaScript (JS), Dalvik VM, and ActionScript VM, DNS prefetch, resource prefetch) is performed, there can be an adverse interaction between the browser management activity and one or more of the browser components that may encounter a noticeable degradation (e.g., due to garbage collection consuming CPU) in the actual or perceived performance of the browser, or lead to overloading of the network causing additional delays (due to DNS prefetch, or resource prefetch) if the browser is already actively downloading other necessary resources. This is especially true in mobile devices, which tend to have slower memory systems and tend to be connected to slower networks when compared to the powerful laptops and desktops that are typically connected to faster Wi-Fi networks and high speed wired networks.

As a consequence, it would be desirable to have apparatus and methods for improved execution of browser management activities relative to the browser processing activities of the browser components.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

In accordance with several embodiments, the invention may be characterized as a computing device that includes a network interface that receives web content, a display that displays a displayable format of the web content, and a plurality of browser processing components that collectively process the web content to generate the displayable format of the web content. In addition, the computing device includes a browser management component that monitors at least one browser processing activity of a corresponding browser processing component and coordinates at least one browser management activity to reduce a likelihood that the at least one browser management activity adversely affects performance of the plurality of browser processing components.

Consistent with many embodiments, the invention may also be characterized as a method for improving operation of a browser. The method includes monitoring activity of at least one browser processing component of the browser that is associated with processing webpage data of a webpage; predicting, based upon the monitoring, subsequent processing activity of the browser that is associated with processing the webpage data; and executing at least one browser management activity based upon the predicted subsequent processing activity to reduce a likelihood that the at least one browser management activity will, adversely affect performance of the browser when the predicted subsequent processing activity is executed.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings where like or similar elements are designated with identical reference numerals throughout the several views and wherein:

DETAILED DESCRIPTION

In several embodiments, the present invention provides improved browser management so that browser management activities are carried out, relative to browser processing activities, in manner that reduces adverse interaction between the browser management activities and the browser processing activities. For example, in many embodiments, browser management activities, e.g., garbage collection, are scheduled in time and/or processor space, e.g., cores in a multi-core application processor, such that any negative impact, e.g., performance degradation and stalls, due to the management overhead is minimized. In some other embodiments, browser management activities, e.g., speculative resource prefetching, need to be scheduled during low network load or network inactivity periods so as not to unnecessarily overload the network, leading to additional delays.

As a consequence, there will be an overall improvement in a user's experience while the user is browsing. For example, the user in many instances will notice a reduced time for web page loading, a reduced time to launch web applications, improved web application performance, and improved browser interaction by reducing sudden stalls and interruptions that may be caused by the management activities.

Although the constructs and methods described herein may be generally applicable across many types of platforms, the advantages of embodiments of the present invention may be enhanced in mobile devices that have a much slower memory subsystem and are connected to slower wireless networks when compared to powerful desktops and laptops that normally use faster Wi-Fi networks and high speed wired networks. This is because many browser management activities (e.g., garbage collection and speculative resource prefetching) involve extensive data movement to and from memory components and other browser components; thus these activities are much slower in mobile devices that are connected to the cellular networks when compared to desktops and laptops that are typically connected to faster Wi-Fi and high speed wired networks.

Figure 1:
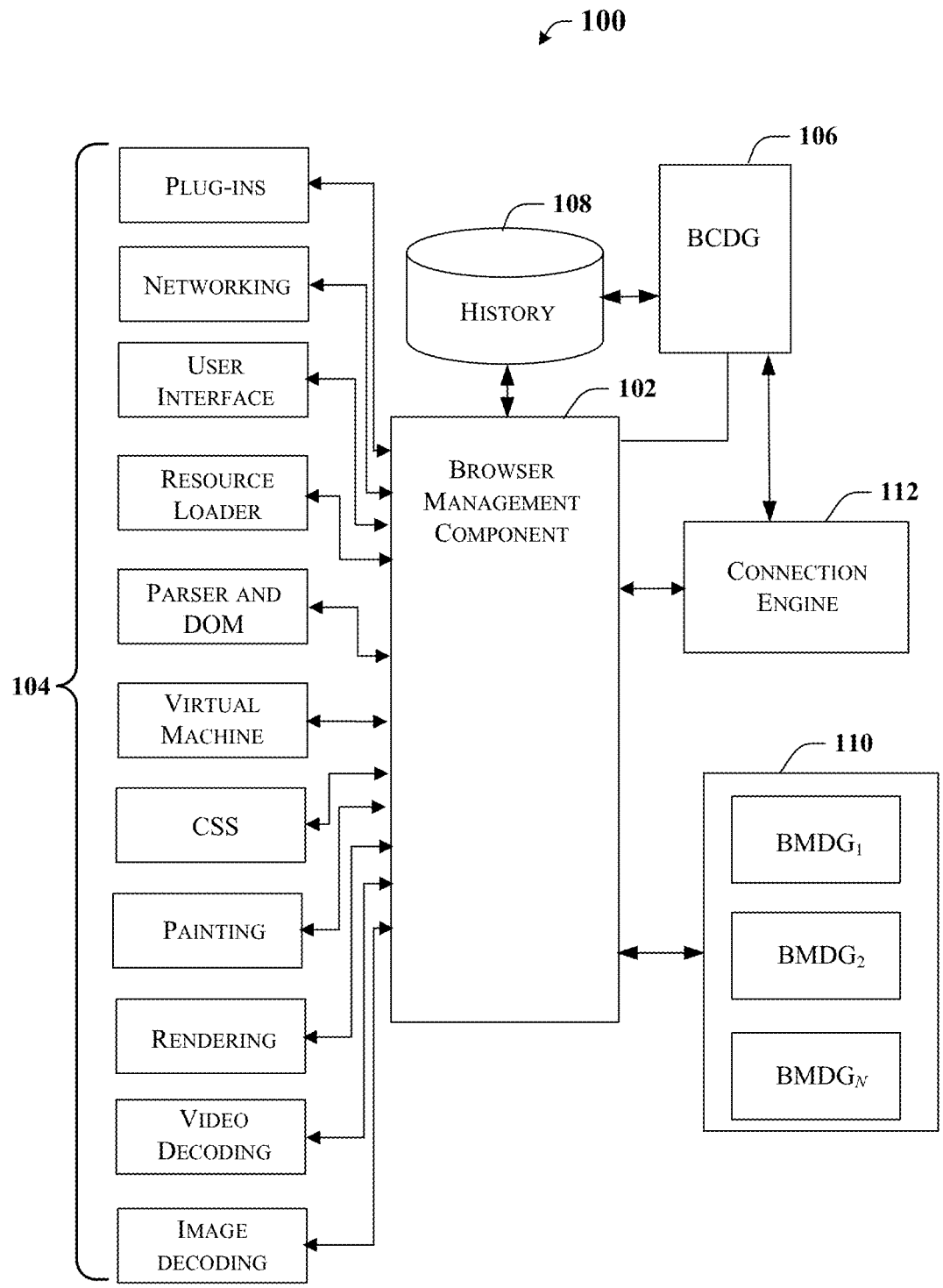
FIG. 1 is a block diagram depicting an exemplary browser according to several embodiments of the present invention.

Referring first to FIG. 1, shown is a block diagram depicting exemplary components of a browser 100 in accordance with one embodiment of the present invention. As shown, the browser 100 in this embodiment includes a browser management component 102 in communication with browser processing components 104 that collectively process web content to generate a displayable format of the web content. In addition, the browser management component 102 is in communication with a browser component dependency graph (BCDG) 106, a history datastore 108, and browser management dependency graphs (BMDG) 110. In addition, a connection engine 112 is in communication with both the browser management component 102 and the BCDG 106 and provides information with the network status (e.g., latency, bandwidth, etc.).

The illustrated arrangement of these components is logical and the connections between the various components are exemplary only. In addition, one of ordinary skill in the art will readily appreciate that the depicted components may be realized by a combination of hardware and software, and can be combined, or further separated and sub-divided, in an actual implementation. In addition, the components can be connected in a variety of ways without changing the basic operation of the system. Moreover, components may be removed and/or supplemented so that more or less components can be utilized in any particular implementation. The components can also be replicated as necessary to deal with concurrency such as the simultaneous loading of multiple web pages in multiple browser tabs. It should also be recognized that although the depicted components are collectively referred to as the browser 100, the depiction is not intended to be a depiction of a browser core, and in addition, many of the components (e.g., video decoding, image decoding, and networking components) may also provide functions outside the context of web browsing.

In general, the browser management component 102 manages an execution of browser management activities based upon browser processing activities that are associated with processing content of a web page. In many implementations, for example, the browser management component 102 considers the browser processing activities by dynamically generating, as discussed further herein, the BCDG 106 to better schedule browser management activities (e.g., memory management activities and speculative resource prefetching via networking components).

In addition, in many implementations, the browser management component 102 considers the execution environment of the browser components (e.g., processor cores, hardware accelerated units, and/or outside chipset) to schedule suitable browser management activities in parallel with browser processing activities. To enhance a user's experience for example, the browser management component 102 may execute a browser management activity and a user interaction activity on two different resources (e.g., processor cores) of a multi-core application processor platform. However, there are certain constraints to be satisfied; for example, a browser management activity that is tied to a particular one of the browser processing components 104 may not be run simultaneously with that particular one of the browser processing components 104. For example, JavaScript execution may not be carried out simultaneously with a JavaScript engine's garbage collection except for rare cases when the JavaScript engine has originally been designed to support limited garbage collection to occur in parallel with execution.

The browser management component 102 may also influence the activity of one or more of the browser processing components 104. For example, the browser management component 102 may request one of the browser processing components 104 (e.g., a virtual machine) to defer a part or whole of its internal management operation so that the particular one of the browser processing components 104 may encounter less stalls or interruptions. The deferred management operation can be scheduled after the browser component activity, and may be carried out in parallel with other browser component activities.

In general, the browser component dependency graph (BCDG) 106 provides data relative to browser processing activities that are not management related. Some examples of browser processing activities include, resource loading, connections through HTTP engines, script execution, DOM creation, CSS calculation, networking, image decoding, layout, rendering, user interface, web view, user interaction, and streaming I/O. As discussed further herein, the content of the BCDG 106 depends on the resources present in a web page and the inherent dependency of the browser activities. The BCDG 106 also depends on the resources (e.g., JavaScript resources) that can block page loading until script execution is complete, followed by DOM updates, layout computations, painting, and rendering.

In the exemplary embodiment depicted in FIG. 1, and in connection with many other variations of the embodiment depicted in FIG. 1, the BCDG 106 is created dynamically during browser execution and the nodes of the BCDG 106 correspond to component activities (e.g., script execution, DOM creating, CSS calculation, networking, image decoding, layout, rendering, browser UI/user interaction, streaming I/O).

In operation, the BCDG 106 enables the browser management component 102 to estimate and predict a timing of the immediate future activities of the browser processing components 104 based on specific parameters and the data indicative of the past history of browser processing activities that is stored as activity history in the history datastore 108. For example, the size of the CSS, JS, HTML text, MIME type, and number and size of images may be utilized. In addition, expected network delays may be predicted based on networking technology (wired, wireless, Wi-Fi, cellular), channel estimations, or round trip time (RTT) values.

In many implementations, the browser management component 102 uses past history of browser component activities that are reflected in the history datastore 108 and computes estimated completion times for ongoing browser processing activities. For example, an estimated time to complete the CSS calculation for a given sized CSS rule may be calculated, and an estimated time to complete script execution for a given sized script may be estimated. It is also contemplated that there may be some variations due to the variation in nature of the current CSS rules, or control flow in JavaScript and those recorded in history for computation of the estimates.

Moreover, the browser management component 102 in this embodiment uses information from the connection engine 112 to predict occurrences of particular network-related activities in temporal relation to other activities. As discussed further herein with reference to FIG. 2 for example, the network delay associated with downloading different resources may be predicted, which in turn, may be used to predict the "time slack" available for performing browser management activities (e.g., speculative resource prefetching). In many implementations, the connection engine 112 is configured to receive network-related information (e.g., reverse link rate and round trip time) from a modem that resides on the same device (e.g., smartphone, netbook, tablet, laptop, etc.) as the browser 100.

In addition, many of the nodes of the BCDG 106 may also have information about the application processor cores, the hardware accelerator assigned for their execution, or information about whether the browser 100 predominantly uses outside chipset resources (e.g., networking).

With respect to the browser management dependency (BMDG) graphs 110, each of the BMDG graphs 110 provides data indicative of a browser management activity. For example, nodes in each of the BMDG graphs 110 may be a specific management activity (e.g., garbage collection), and the nature of each of the BMDG graphs 110 is linear with barriers demarcating the scheduling range. For example, a barrier may include an inability of the virtual machine's garbage collector to operate when the virtual machine is busy executing (e.g., scripts) and vice versa. And in the context of garbage collection management activities, the nodes may be the different types of garbage collection (e.g., mark and compact, mark and sweep, and copy collection).

In general, the BCDG 106 and the different BMDG graphs 110 are independent, but they synchronize at specific spots that act like a barrier for scheduling. As an example, the synchronizing points for garbage collection management activities of a virtual machine (e.g., a scripting engine) are the two consecutive execution activities of the virtual machine (e.g., script execution times). Also, in many instances a scripting engine must run garbage collection before it can allocate new objects in its heap to continue progression.

As depicted in FIG. 1, there may be multiple BMDGs for the different categories of browser management activities that may be possible by the different browser processing components 104. For example, separate BMDGs are used for each unrelated category of browser management activities and for different browser components. Although many examples are provided herein of browser management activity in the context of garbage collection activity, it should be recognized that embodiments of the present invention are certainly not limited to managing garbage collection relative to browser processing activities, and that the scheduling of other browser management activities (e.g., in time and processor-resource space) is certainly contemplated.

In general, a browser management activity is an activity that can be done independently before, during, or after the particular one of the browser processing components 104 it is related with, and browser management activity contributes to proper functioning or increased efficiency of the related one of the browser processing components 104. The browser 100 deals with different types of resources: I/O (e.g., modem), Memory, CPU, GPU, and different hardware accelerators. And I/O tends to be a blocking resource, at least at in the initial part of the browsing activity, and memory is shared and is slow and limited in mobile devices. But CPU, GPU, and accelerators can run concurrently, so the BMDG's overall role is to use these device resources effectively. Some general examples of browser management activities and associated events include:

I/O—a goal in many embodiments is to achieve close to optimal use of available bandwidth (BW). An example of a near optimal use of bandwidth is a 1.5 MB browser file that is downloaded in 8 sec via 1.5 Mbps link. DNS lookup is an exemplary activity can be performed early so as to minimize server delays. Moreover garbage collection may be performed preemptively in preparation of a page load start; printable snapshots of previously loaded web page may be taken in parallel; and JavaScript engine heap content may be cached and prioritized to ensure new arriving content does not erase content that could be needed within a pre-decided future timeline.

Accelerators—efficient image caching is an exemplary activity that may be carried out so that there is no need to wait for image decoding while scrolling.

CPU—some exemplary activities include multicore scheduling, managing blocking effects of synchronous threads, coherency, and coprocessors. In addition, another activity includes detection of a single or multi-core idle state in connection with one or more other components in an idle state in order to perform idle time garbage collection. And multiple browser tabs may be scheduled so that the foreground tab gets as much of the resource as it needs while the background tabs share the remaining CPU bandwidth.

Memory—evicting cache memory while waiting on I/O is one exemplary browser management activity associated with memory.

More specific examples of browser management activities include:

Determination of stale entries and pre-evicting them from the browser/network cache so that the browser can populate them with new desired entries later.

Runtime determination of the useful data to be cached.

Collection of runtime profiles and data for future use by the browser.

Moving data from browser memory cache to persistent device cache.

Taking a snapshot of a JavaScript engine's heap contents and objects, serializing it into a bit stream, and copying it into persistent memory, and vice versa (i.e., de-serialization from a bit stream and copying resultant de-serialized bit stream into JavaScript engine's heap as objects).

Making a snapshot of a webpage to use as a thumbnail for history/favorites in next session.

Speculative/non-speculative content/resource prefetching by the browser.

Precompiling certain scripts before they need to be run in the browser so that compiled code is available when browsing the webpages that uses those scripts.

And tiling for backing may be carried out in advance. For example, pre-computing different tiles that may be used in immediate future may be carried out.

As discussed further herein, the BMDG nodes (each relating to a specific management activity) are executed in time ranges and resource slots, such that they are not simultaneously assigned to the same resource and time slots as the nodes of the BCDG 106. And in addition, in many implementations, the browser management component 102 manages the browser management activities to avoid overlapping execution of a browser processing activity (a node in BCDG) executed by a particular one of the browser processing components 104 and a management activity (a node in BMDG) associated with the particular one of the browser processing components 104, irrespective of their resource mappings. But it is contemplated that there may be certain specific designs and implementations of a particular browser processing component where the design and implementation can allow for partial or full execution of its browser management activity in parallel with the processing activity carried out by the particular browser processing component.

As discussed above, in many variations the browser management component 102 schedules the browser management activities (e.g., garbage collection) both in time and in processor space (e.g., using different cores of a multi-core application processor) such that any negative impact (e.g., performance degradations and stalls) due to the management overhead is minimized.

If time scheduling is not possible or resource slots are not available, then a fall back option may be either to wait for a suitable scheduling, or perform the typical existing ad-hoc approach to browser management operations. It is expected that multi-core platforms with hardware acceleration support will provide a greater opportunity for improved browsing quality with respect to single core platforms without hardware acceleration since there will be more available resource slots to accommodate the different activities.

While referring to FIG. 1, simultaneous reference will be made to FIG. 2, which is a flow chart depicting an exemplary method that may be carried out in connection with the embodiment depicted in FIG. 1. As shown, data that is indicative of browser processing activities is stored in the history datastore 108 to create a history of browser processing activity (Block 202). As discussed, the history of browser processing activity enables the browser management component 102 to predict the processing activity that is likely to follow current processing activity, and in some instances, the history enables the browser management component 102 to predict processing times associated with processing activities.

In addition, prediction of the time-gap (or slack available) in the future activities of certain browser processing components 104 may be made from the dependency of the resources in a webpage and the information about the historical data on the time taken to download different MIME types. Similarly the browser 100 can maintain a history of the network downloading time of different MIME types from each individual domain of a particular webpage and predict the current resource download times for these MIME types. For example, if a news web site changes its primary headline photo every day, but that image is always a 2 Megapixel JPEG, then a reasonable estimate can be made about the expected size. This enables effective prediction of the available time slack to perform any browser management activities.

The connection engine 112 can be used to determine the network delay for the different resources to be downloaded which can in turn be used for predicting the time slack available for performing browser management activities. The connection engine 112, for example, may obtain information from a modem of the transceiver component. 328 shown in FIG. 3. Thus when a network or memory of a device are blocking the main browser activities, which leads to the creation of under-taxed computing resources in the device, browser management activities can be scheduled in the CPU slack time. Similarly when the network is inactive and under-taxed, network-oriented browser management activities (e.g., speculative resource prefetching) can be performed.

Some of the browser management activities may include activities that do more than ensure the functional correctness of the browser's operation. For example, some browser management activities can be independent enough with respect to the current browsing activities that these browser management activities actually perform some activities that improve performance of the browser itself.

As an example, when the inactivity time of the network hardware (e.g. modem) is detected or predicted through the connection engine 112, the browser can speculatively request to download a component that it might need. For example, DNS prefetching may be carried out, TCP pre-connection can be executed, or object prefetching of a main object from each of the most frequently visited (e.g., 10 most frequently visited) websites may be carried out.

In addition, real time activity of browser processing components 104 is also monitored (Block 204), and the real time activity is used, at least in part, to create the BCDG 106 (Block 206). As discussed, the BCDG 106 includes dependency information in connection with the browser processing components 104. In addition, a browser management dependency graph is also created (Block 208), which includes dependency information in connection with a browser management activity. As discussed, one or more BMDG graphs 110 may be created depending upon the browser management activities that are carried out.

As shown, the subsequent browser processing activity is predicted using the monitored real time activity and the BCDG 106 (Block 210). For example, particular browser processing activities may be predicted, and in some instances, the amount of time that each browser processor activity will take to complete is also predicted. And the predicted subsequent processing activity is utilized to execute browser management activity so as to reduce a likelihood (e.g., prevent) that the browser management activity will adversely affect performance of the browser (Block 212).

For example, if a browser management activity is known to adversely affect (e.g., conflict with) a particular one of the predicted subsequent processing activities, the browser management component 102 may either execute the browser management activity in advance of, or after, the particular one of the subsequent activities. Or alternatively, the browser management component 102 may reduce the browser management activity (e.g., with respect to time and/or intensity) so that if the browser management activity must be carried out closely in time (or at the same time) as the particular one of the subsequent activities, the effect of the browser management activity upon the particular one of the subsequent activities is reduced.

Figure 3:
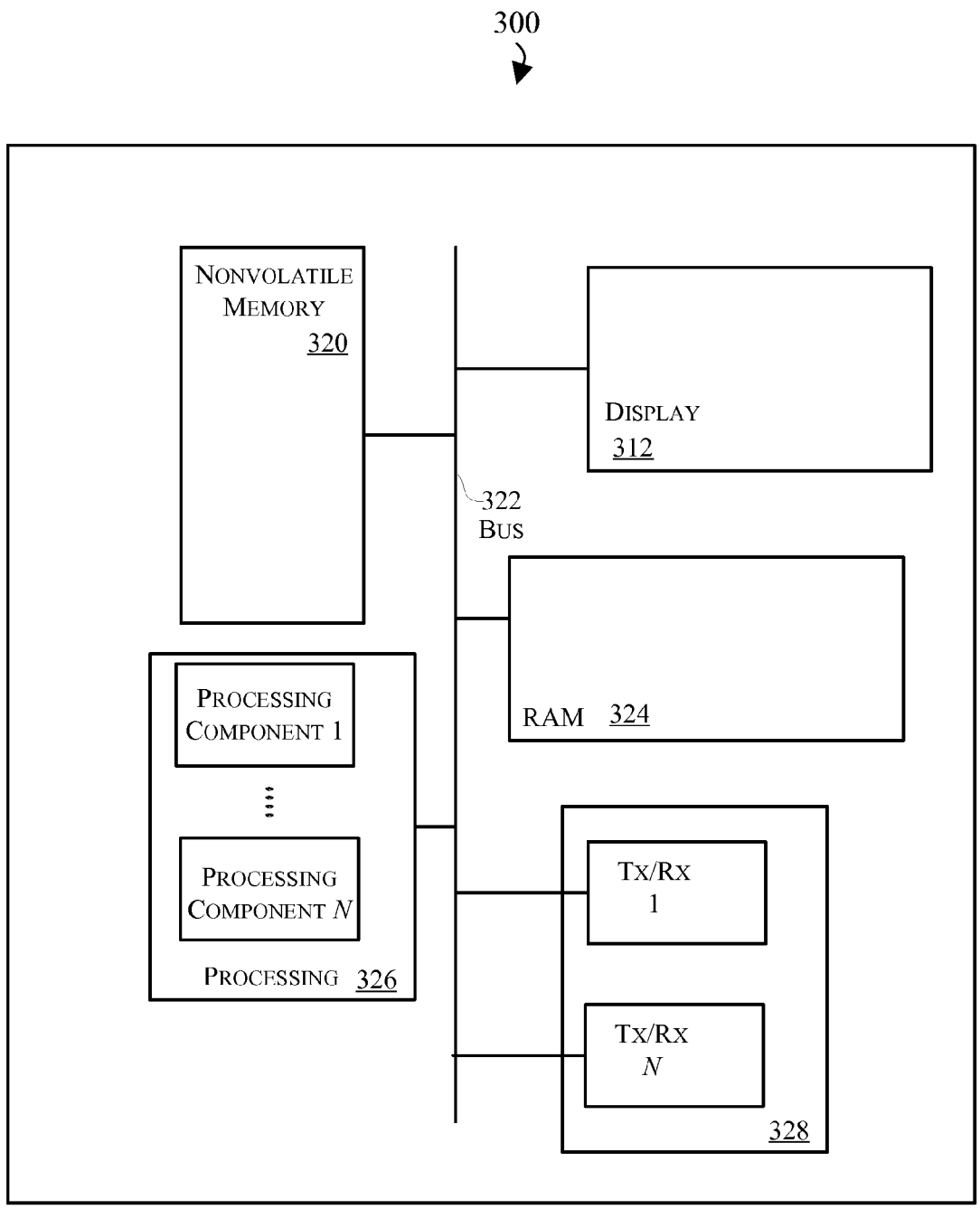
FIG. 3 is a block diagram depicting physical components of a communication device that may be utilized in connection with the browser depicted in FIG. 1.

Referring next to FIG. 3, shown is a block diagram depicting physical components of an exemplary content display device 300 that may be utilized to realize the browser 100 described with reference to FIG. 1. As shown, the content display device 300 in this embodiment includes a display 312, and nonvolatile memory 320 that are coupled to a bus 322 that is also coupled to random access memory ("RAM") 324, N processing components 326, and a transceiver component 328 that includes N transceivers. Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 312 generally operates to provide a presentation of content to a user, and may be realized by any of a variety of displays (e.g., CRT, LCD, HDMI, micro-projector and OLED displays). And in general, the nonvolatile memory 320 functions to store (e.g., persistently store) data and executable code including code that is associated with the functional components depicted in FIG. 1. In some embodiments for example, the nonvolatile memory 320 includes bootloader code, modem software, operating system code, file system code, and code to facilitate the implementation of one or more portions of the browser discussed in connection with FIG. 1 as well as other components well known to those of ordinary skill in the art that are not depicted nor described in connection with FIG. 1 for simplicity.

In many implementations, the nonvolatile memory 320 is realized by flash memory (e.g., NAND or ONENAND memory), but it is certainly contemplated that other memory types may be utilized as well. Although it may be possible to execute the code from the nonvolatile memory 320, the executable code in the nonvolatile memory 320 is typically loaded into RAM 324 and executed by one or more of the N processing components 326.

Figure 2:
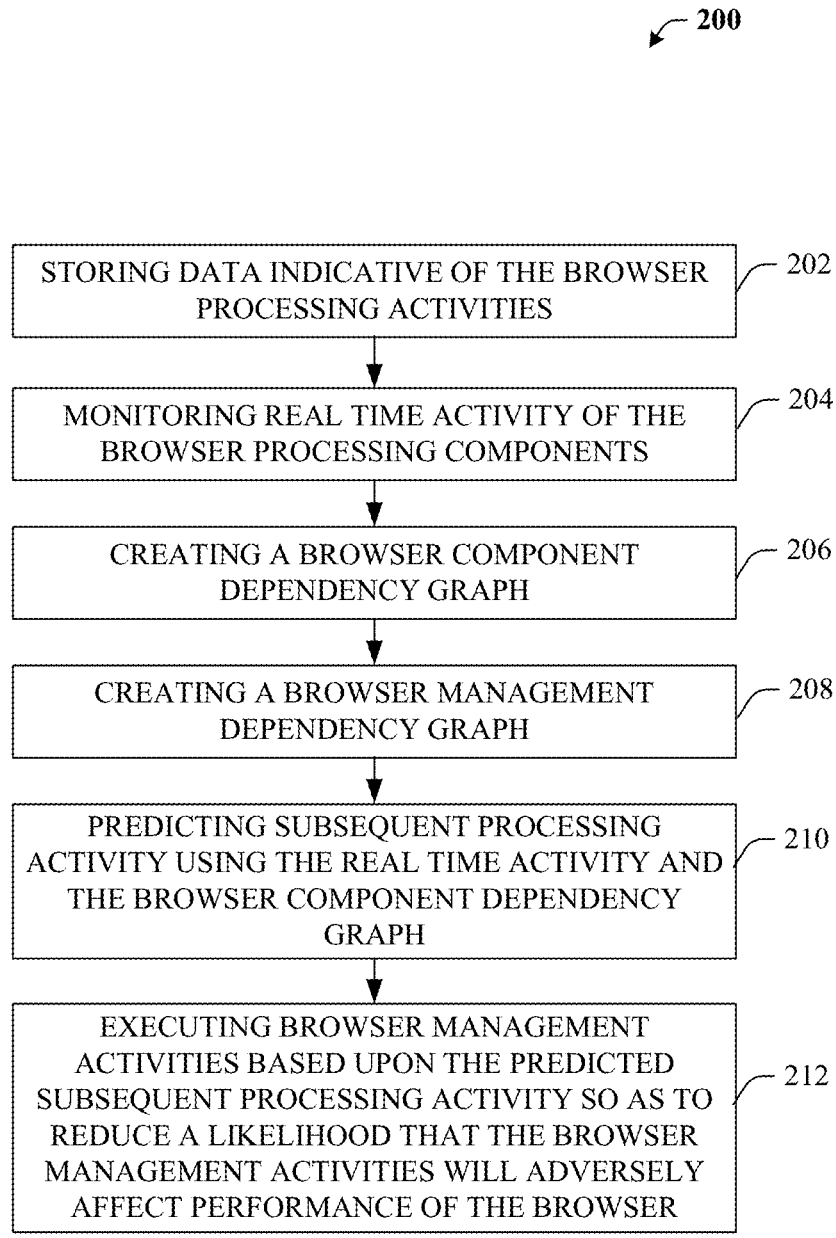
FIG. 2 is a flowchart depicting a method that may be carried out in connection with the browser depicted in FIG. 1.

The N processing components 326 in connection with RAM 324 generally operate to execute the instructions stored in nonvolatile memory 320 to effectuate the functional components depicted in FIGS. 1 and 2. As one of ordinarily skill in the art will appreciate, the N processing components 326 may include a video processor, modem processor, DSP, graphics processing unit (GPU), and other processing components.

The transceiver component 328 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

It should be recognized that FIG. 3 is merely exemplary and in one or more exemplary embodiments, the functions described herein may be implemented in hardware, software, firmware, or any combination thereof. If implemented in software, the functions may be stored on or transmitted over as one or more instructions or code encoded on a non-transitory computer-readable medium. Non-transitory computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 4A:
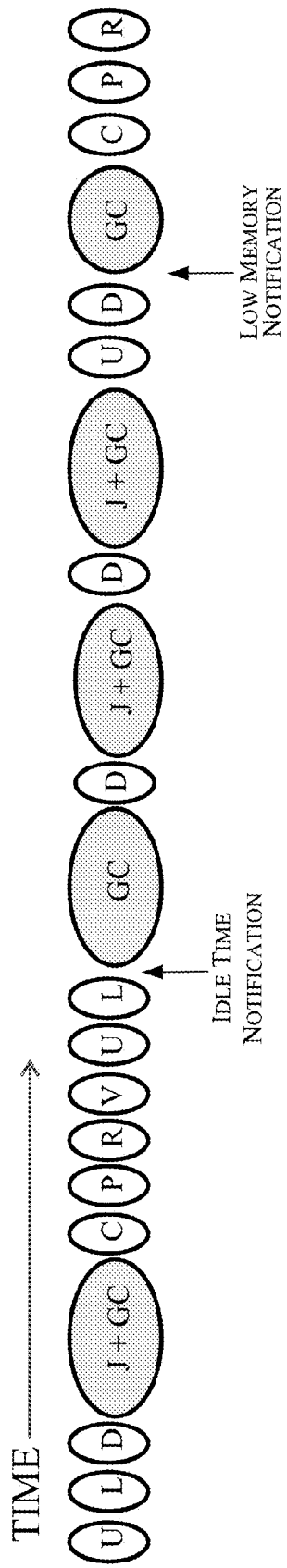
FIGS. 4A and 4B are diagrams depicting a typical sequence of browser processing activity and a sequence of activity that may be carried out in accordance with the present invention, respectively.
Figure 4B:
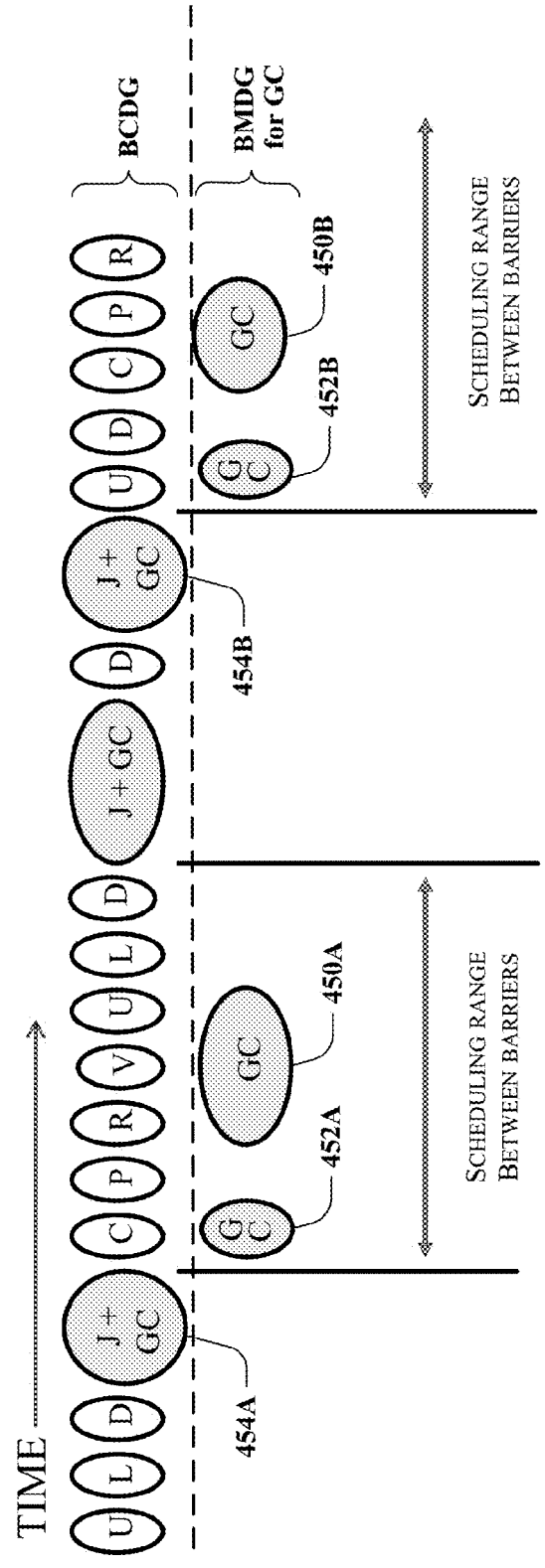

Referring to FIGS. 4A and 4B shown are an exemplary sequence of browser component activities that may be carried out in a typical prior art browser and a sequence of activities that may be carried out in the browser 100 depicted in FIG. 1, respectively. The activities depicted in these examples include user interface activity (U), resource loader activity (L), HTML parsing and DOM creation (D), JavaScript execution (J), garbage collection (GC), CSS calculation and layout (C), painting (P), rendering (R), and video decoding (V).

Both FIGS. 4A and 4B depict sequences of activities that are carried out by browser components in connection with garbage collection management activities.

As shown in FIG. 4A, garbage collection (GC) in prior systems happens when explicitly triggered by the browser and when triggered internally by a browser component for its own management. For example, the browser may trigger garbage collection (GC) by sending a low-memory-notification when memory that is available for the browser is very low. And in addition, the browser may also prompt garbage collection (GC) by sending an idle-time-notification that may occur after a period of user inactivity. Although idle time garbage collection reduces memory pressure when the user is not doing anything active on the device, if user activity occurs before the scheduled time duration, the garbage collection is postponed.

Garbage collection may also be triggered internally by a browser component for its own management. As depicted in FIG. 4A for example, a JavaScript engine may trigger its own garbage collection (J+GC) when object allocations fail because the heap is running low on memory; necessary legacy-generation object space is full; and/or when fragmentation is high and there is a lot of wasted space.

The idle time and low memory browser management strategies in FIG. 4A, do not take advantage of multiple processing resources (e.g., multi-core processors), nor do these approaches consider the activities of the different browser components and their dependencies. Moreover, the idle time and low memory browser management strategies in FIG. 4A do not include a browser processing component (e.g., the JS engine) using the activity and dependency information of the other browser components to influence the schedule for its own internal management activities (e.g., garbage collection activity).

In contrast, as depicted in FIG. 4B, browser management activity in many embodiments of the present invention is performed in parallel with browser component activities and a portion of browser management activity is deferred. More specifically, shown in FIG. 4B are a browser component dependency graph and browser management dependency graph for garbage collection. As depicted, instead of being carried out responsive to idle time notification or responsive to low memory, a first garbage collection 450A and second garbage collection 450B are carried out preemptively (e.g., garbage collection is done before it is needed without waiting for it to be required or urgent) in time periods in scheduling ranges that occur between barriers formed by specific browser component activity—in this example JavaScript execution. As shown, between the barriers, the garbage collections 450A, 450B, 452A, and 452B, are carried out in parallel with browser component activities that the garbage collections 450A, 450B, 452A, and 452B do not adversely affect. More specifically, the first garbage collection 450A is carried out in parallel with rendering (R), video decoding (V), and user activity (U) and a second garbage collection 450B is carried out in parallel with CSS calculation and layout (C), painting (P).

In addition, shown are a first deferred garbage collection 452A and a second deferred garbage collection 452B, which are deferred until after a first script execution 454A and a second script execution 454B, respectively. In the example depicted in FIG. 4B, some garbage collection is carried out during the first script execution 454A and the second script execution 454B as needed to enable script execution to complete, but in other instances, all garbage collection may be deferred to further reduce the intermittent stalling of script execution that may occur when garbage collection is carried out. Moreover, the deferred garbage collections 452A, 452B may be run as threads that are separate from threads of browser processing activities that are executing in parallel.

Although the benefits of parallel and deferred browser management activities are described in comparison to idle time browser management and low memory management, the parallel and deferred management approaches depicted in FIG. 4B are complementary to these prior approaches (e.g., the parallel and deferred browser management may be used in connection with the idle time and low-memory-triggered management approaches).

Figure 5:
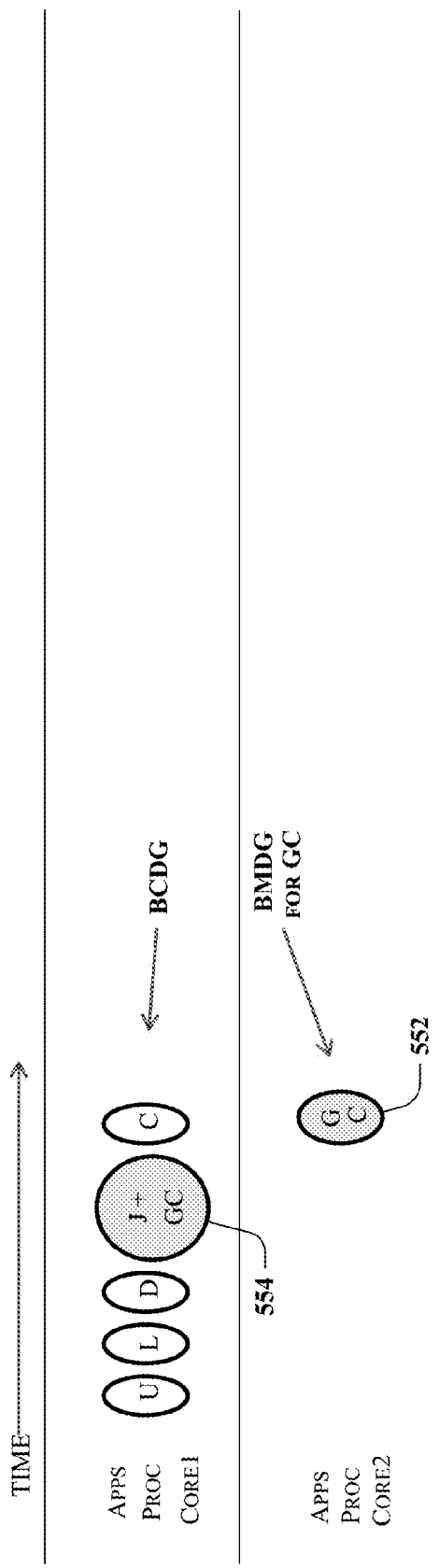
FIG. 5 is a diagram depicting an exemplary mode of operation in the context of a browser component dependency graph and a browser management dependency graph.

Referring next to FIG. 5, shown are a browser component dependency graph and browser management dependency graph depicting exemplary browser component activity and browser management activity, respectively. As shown, a deferred garbage collection 552 takes place after a script execution 554 so that garbage collection that is internal to a JavaScript engine is partially deferred so that a remainder of the garbage collection occurs after script execution. In many implementations, the browser management component 102 directs the partial deferment of the garbage collection 552 to occur based upon a prediction (e.g., made on the basis of the current BCDG and the past history from the history datastore 108) that CSS calculation and layout (C) will be clone following the script execution 554. In addition, the browser management component 102 schedules the partial deferment of the garbage collection 552 for execution on a separate processing core than the processing core that is executing the browser processing activities in the BCDG.

Figure 6:
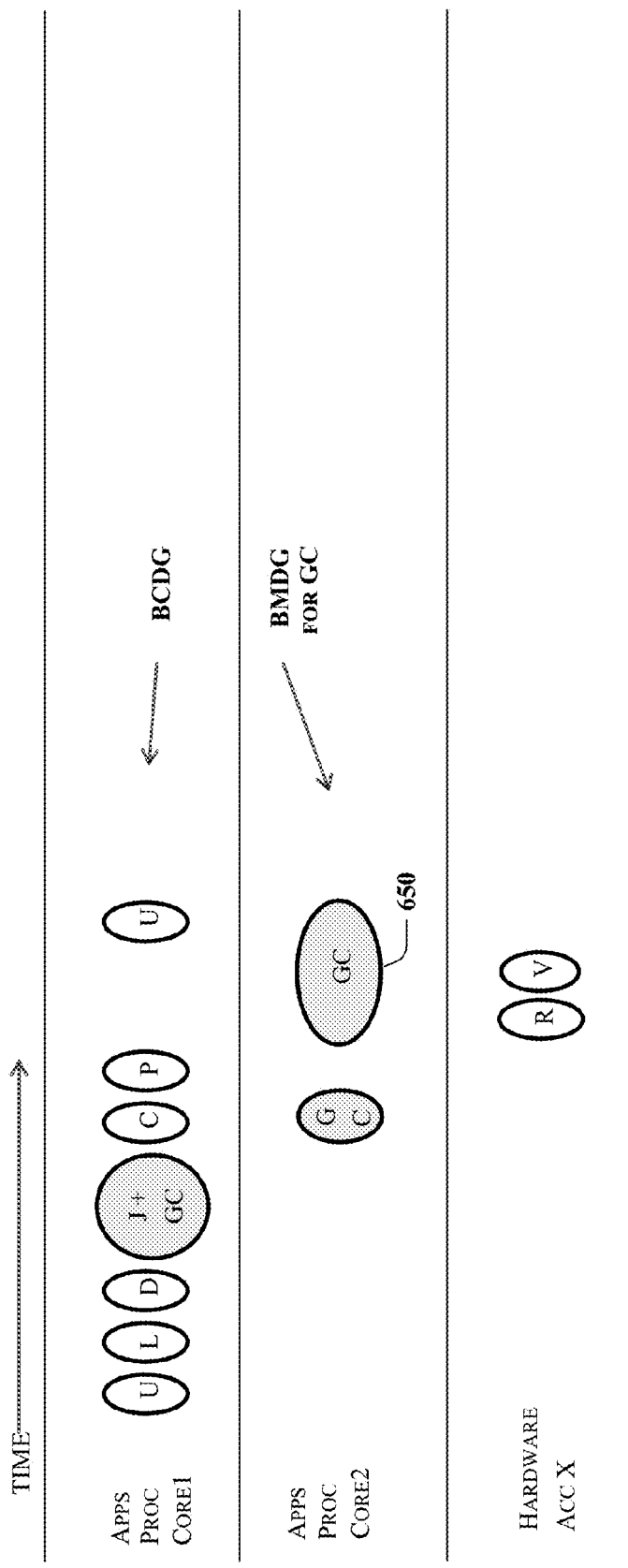
FIG. 6 is a diagram depicting another exemplary mode of operation in the context of a browser component dependency graph and a browser management dependency graph.

Referring next to FIG. 6, shown are browser component dependency graphs and browser management dependency graphs depicting exemplary browser processing activity and browser management activity in connection with other browser processing activity (rendering (R) and video decoding (V)). As shown in the depicted series of activities, the browser management component 102 has determined that a preemptive garbage collection 650 for a JavaScript engine may be carried out on a second processing core even though there are rendering (R) and video (V) decoding activities in progress on a hardware accelerator and while user interaction (U) is handled on a first processing core.

Figure 7:
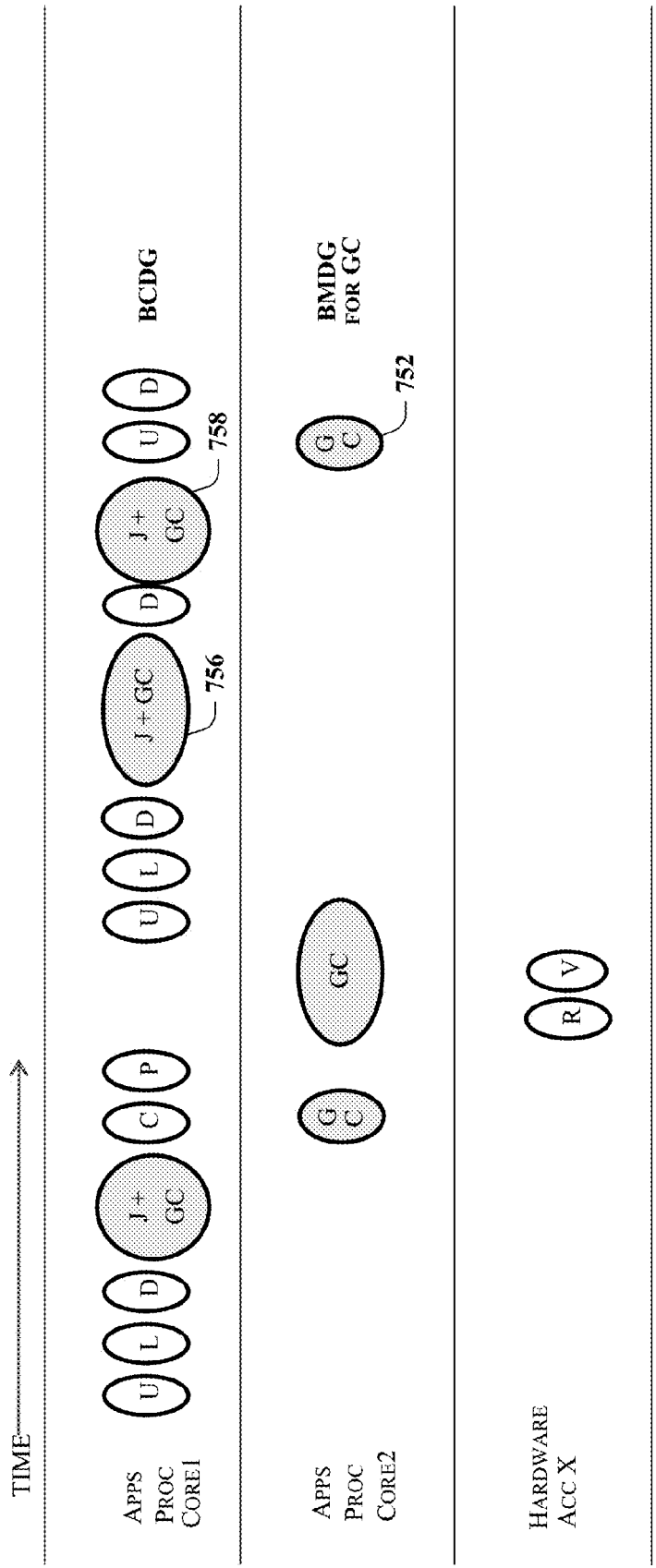
FIG. 7 is a diagram depicting yet another exemplary mode of operation in the context of a browser component dependency graph and a browser management dependency graph.

Referring to FIG. 7, it is a diagram depicting browser component dependency graphs and browser management dependency graphs according to another mode of operation. In the sequence of events depicted in FIG. 7, the JavaScript engine's internal garbage collection 756 could not be deferred until after script execution. In some instances for example, too many short-lived objects are created during script execution that exert pressure on a memory heap, and as a consequence, garbage collection cannot be deferred even though the browser management component 102 may prompt the JavaScript engine to defer garbage collection. More specifically, the JavaScript engine may override the browser management component's 102 attempts to defer garbage collection based upon its own internal conditions. As shown, at a later time a script execution 758 takes place and at least a portion of the garbage collection is executed during a deferred garbage collection 752.

Figure 8:
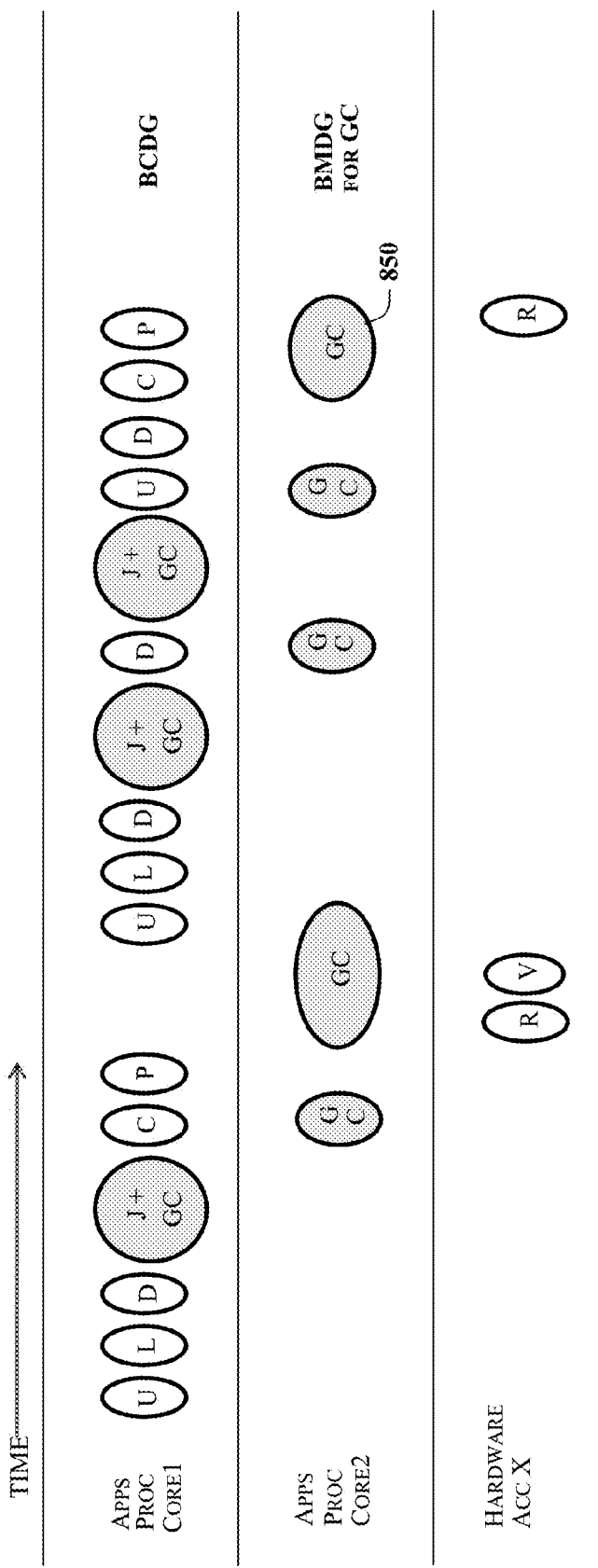
FIG. 8 is a diagram depicting an aspect of operation in the form of a browser component dependency graph and a browser management dependency graph.

Referring to FIG. 8, shown are browser component and browser management dependency graphs depicting another mode of operation. As shown, the browser management component 102 in this mode of operation triggers a garbage collection 850 management activity (e.g., due to an actual or anticipated low memory condition) that is executed by a second processor core simultaneously with rendering (R) that is executed by a hardware accelerator and simultaneously with CSS calculation and layout (C) and painting (P) activities that are executed by a first processing core. This parallel execution of browser management activity (e.g., garbage collection) substantially increases the scope of browser management activity beyond the existing techniques (e.g., idle time garbage collection).

Figure 9A:
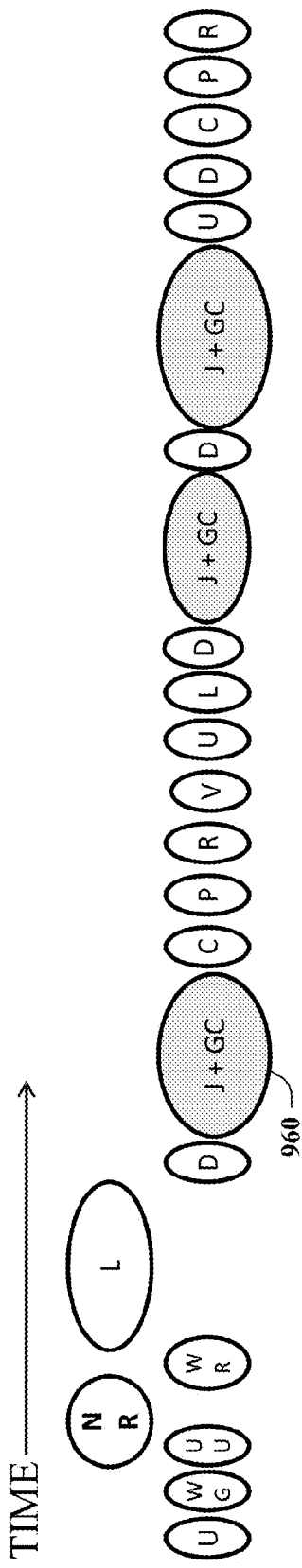
FIG. 9A is a diagram depicting a sequence of browser processing activity of a typical browser.
Figure 9B:
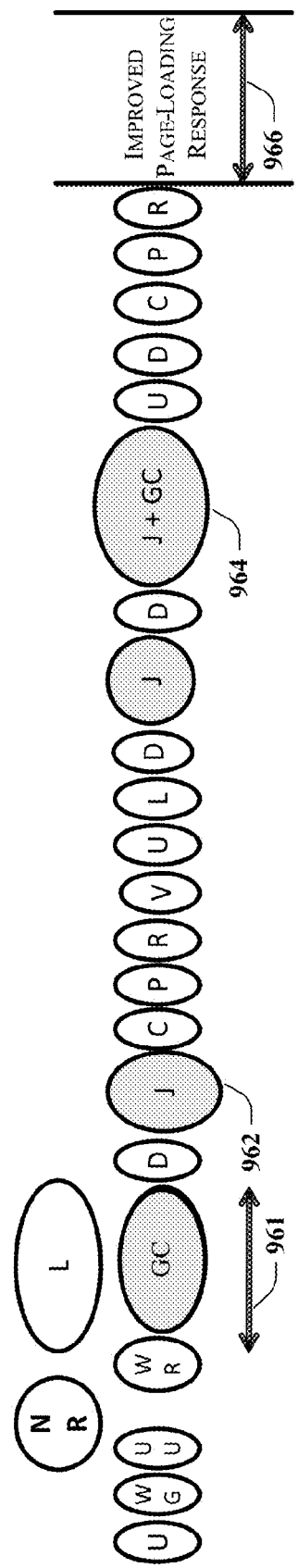
FIGS. 9B and 9C are diagrams depicting sequences of browser processing activity that may be carried out in accordance with many embodiments of the present invention.

Referring next to FIGS. 9A and 9B, shown are existing and improved approaches (improved according to many embodiments of the present invention) to carrying out browser processing activity, respectively. As shown in FIG. 9A, which depicts a typical approach to receiving and processing content of a webpage, when a user requests a webpage (U), an initial network GET for webpage loading (L) is issued, HTML parsing and DOM creation (D) is carried out, and after HTML parsing and DOM creation (D), garbage collection is carried out in connection with JavaScript execution 960 to enable the JavaScript to be executed to completion. As discussed above, when a JavaScript engine carries out garbage collection while executing a JavaScript, page loading may be stalled and the browser may generally become less responsive.

FIG. 9A also shows the network redirections typically encountered by a mobile device. For mobile devices, the browser actually loads the mobile version of the webpages, and as a result, there is some network redirection activity that includes the main webpage redirecting to the mobile version of the web pages. Hence, the response to a Webkit GET request (WG) would be a network redirection response (NR) that is processed (WR)(e.g., by a Webkit engine), the user interface would be updated to indicate the page loading has started (UU), and then an initial network GET for the web page loading (L)(also referred to a an initial network request) is carried out. Thus, even if the network redirection response (NR) and initial network GET (L) are in a separate network thread than the Webkit GET request (WG) and the processing of the network redirection response (WR) that are in the Webkit thread, there is a sequential dependency as follows: WG→NR→WR→L.

In contrast, as depicted in FIG. 9B, garbage collection (GC) is carried out in the JavaScript engine during an initial network response/latency period 961 during the initial network GET for the web page loading (L); thus enabling JavaScript execution 962 without garbage collection to be carried out to prevent the garbage collection management activity from adversely affecting execution of a JavaScript.

In FIG. 9B the preemptive garbage collection is done in the same thread as the Webkit thread, and occurs during the initial network GET for web page loading (L) (also referred to as an initial network request). Although a subsequent JavaScript execution 964 may be required, overall the garbage collection during the initial network response/latency period 961 provides an improved a page-loading response time 966.

Figure 9C:
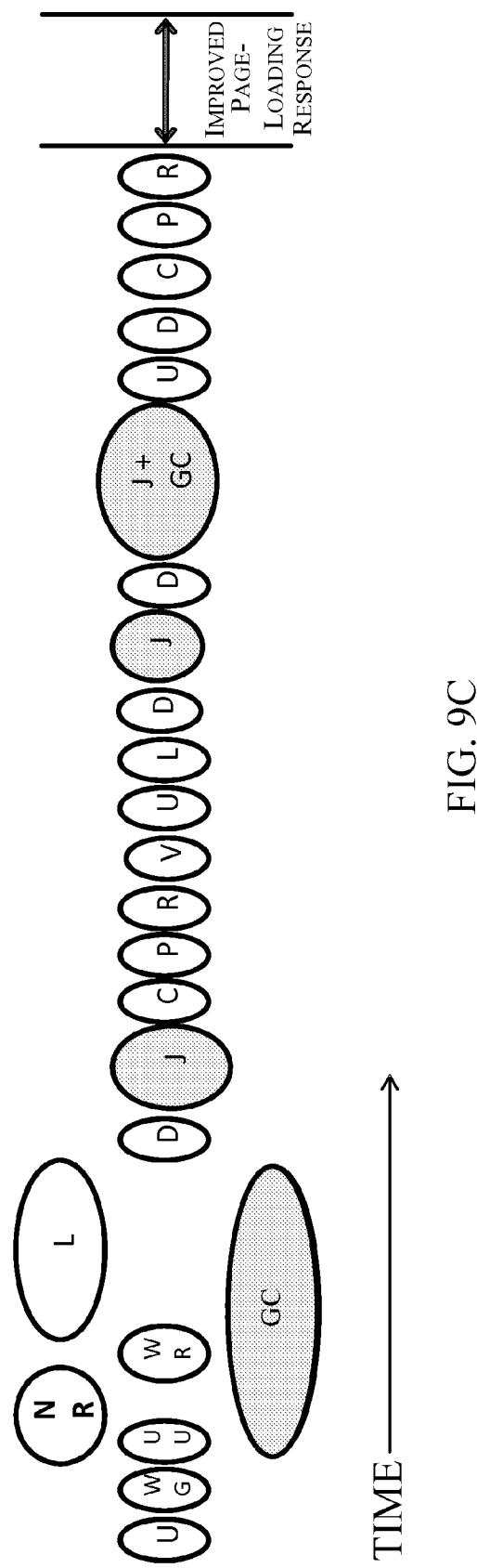

FIG. 9C shows further improvement when the garbage collection (GC) activity can occur in a different thread (e.g., when multiple cores are available) so that the garbage collection (GC) does not block the network redirection (NR) processing. As depicted, the garbage collection (GC) effectively can start just after user interaction, in parallel with network redirection (NR) and network load (L), and continue effectively before a javaScript activity (J) starts. The example in FIG. 9C is appropriate for multi-cores and when separate garbage collection (GC) threads are feasible. In this case the preemptive garbage collection is done as a separate thread from the Webkit thread; thus creating a larger window of opportunity for garbage collection (GC) since it can start immediately after the Webkit GET (WG) and continue until the initial network GET for web page loading (L)(also referred to as an initial network request), is done. In this example, it can even start immediately after a user requests a web page (U) and continue until just before the first JavaScript execution (J) starts. As a consequence the browser management component in many embodiments manages garbage collection by detecting when the browser requests the webpage and then preemptively executing a garbage collection management activity while page resources of the webpage are arriving.

During the initial network response/latency period (e.g., latency period 961), which begins when a user types in a URL that tells a browser where to go to load a web page, page resources are arriving from a web server. And during this latency, nothing else can be done because data is not yet available to process. In many instances, the latency period may vary from 200 milliseconds to 1.5 seconds or more depending upon the particular networking technology (EDGE, 3G, WiFi, LTE) and upon the network conditions. Furthermore, there are certain websites that redirect the browser to other websites to fetch the resources for the web pages. These network redirects also impact the initial network response/latency period.

In many variations, an intensity of the garbage collection that is carried out may be varied from a low intensity garbage collection, which may take 0.1 seconds, to a medium intensity garbage collection, which may take 0.5 seconds, to the most intensive garbage collection, which may take 1.5 seconds. In some modes of operation, an intensity of the garbage collection (GC) may be based upon the type of network that is used to receive the content. Cellular networks, for example, may be associated with a longer latency period, and as a consequence, cellular networks may provide a better opportunity to exploit the latency period to perform more intensive preemptive garbage collection (GC).

In many implementations, the browser management component 102 is designed to operate according to one (or both) of two modes of operation: 1) a mode in which garbage collection (GC) and resource loader activity (L) operate as independent threads; and 2) a mode in which the garbage collection (GC) and resource loader activity (L) operate in the same thread. The reasons for this are the resource loader activity (L) may include handling-server-originated redirections plus other network requests, and if garbage collection (GC) operates and prevents the resource loader activity (L) from handling the redirections immediately, response times are likely to actually worsen.

In the context of a platform that is capable of executing independent threads, unless the requested content is already locally cached, the garbage collection (GC) may be initiated as soon as a request for the content is submitted, and the intensity of the garbage collection (GC) that is carried out may be based upon platform specific empirical data. For example, history of a latency period (e.g., latency period 961) may be retained in the history datastore 108 and may be used to predict the latency period in the future, which will enable the browser management component 102 to select an intensity of the garbage collection GC.

With respect to a platform in which the garbage collection (GC) and resource loader activity (L) operate in the same thread, instead of immediately initiating the garbage collection, the browser management component 102 may wait for an initial response, and if the initial response is a redirect, the redirect is handled, but if the initial response is a first real header, an expected length of the main resource is checked, and if the length is above a threshold, a preemptive garbage collection is carried out. Alternatively, a "scavenge" style garbage collection may be carried out before the first header arrives. But if the length of the main resource is too small (e.g., below the threshold) and preemptive garbage collection is carried out, page loading times may actually be longer, so if garbage collection (GC) is carried out at all, it is a "light," reduced intensity garbage collection.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A computing device comprising:
a network interface that receives web content;
a multi-core application processor;
a display that displays a viewable format of the web content;
a plurality of browser processing components that collectively generate, at the computing device, a displayable format of the web content, each of the plurality of browser processing components carrying out a corresponding browser processing activity at the computing device, wherein the browser processing components include a scripting-language-based engine that carries out a corresponding script execution processing activity; and a browser management component that monitors and stores, at the computing device, data indicative of the script execution processing activity of the scripting-language-based engine to create an activity history for the scripting-language-based engine, and the browser management component monitors real time activity of the scripting-language-based engine and uses the real time activity and the activity history to predict a timing of subsequent script execution activity, and the browser management component coordinates garbage collection activity at the computing device so the garbage collection activity occupies a different time period than the subsequent script execution processing activity or the garbage collection activity is carried out by a core of the multi-core application processor that is not being used at the same time to carry out the subsequent script execution processing activity to reduce a likelihood that the garbage collection activity adversely affects performance of the scripting-language-based engine.

2. The computing device of claim 1, wherein the browser management component generates:

a browser component dependency graph that conveys a dependency of the browser processing activities that are associated with the web content; and at least one browser management dependency graph that conveys a dependency of the garbage collection activity to enable the browser management component to schedule the garbage collection activity to reduce the likelihood that the garbage collection activity adversely affects performance of the scripting-language-based engine.

3. The computing device of claim 1, wherein the browser management component effectuates the garbage collection activity as two separate portions so that a first portion of the garbage collection activity is carried out during a first time period to enable the script execution processing activity to be carried out, and a subsequent portion of the garbage collection activity is carried out at a later time period to enable the script execution processing activity to be completed faster than if the garbage collection activity were effectuated during a single, continuous time period.

4. The computing device of claim 1, wherein the browser management component coordinates the garbage collection activity by initiating execution of the garbage collection activity during an event selected from a group of events consisting of a network blocking period, an I/O blocking period, and a memory blocking period.

5. The computing device of claim 1, wherein the browser management component coordinates the garbage collection activity by managing processing resources so that the garbage collection activity and the script execution processing activity are processed by separate processing resources.

6. A method of improving operation of a browser operating on a computing device, the method comprising:

monitoring, at the computing device, activity of at least one browser processing component of the browser, wherein the at least one browser processing component of the browser is associated with processing webpage data of a webpage, wherein the at least one browser processing component is selected from the group consisting of a scripting-language-based engine, a calculation and layout component, a painting component, a rendering component, a video decoding component, and an image decoding component wherein the monitoring includes:

storing data indicative of the activity of the at least one browser processing component of the browser to create an activity history for the at least one browser processing component of the browser; and monitoring real time activity of the at least one browser processing component of the browser;

predicting, at the computing device, based upon the monitoring, subsequent processing activity of the browser, wherein the subsequent processing activity is associated with processing the webpage data and the subsequent processing activity is selected from the group consisting of script execution, calculation and layout activity, painting, rendering, video decoding, and image decoding; wherein the predicting subsequent processing activity of the browser includes using the real time activity and the activity history for the at least one browser processing component to predict a timing of the subsequent processing activity; and executing at least one browser management activity at the computing device based upon the subsequent processing activity so the at least one browser management activity occupies a different time period or different processor space than the subsequent processing activity to reduce a likelihood that the at least one browser management activity will adversely affect performance of the browser when the subsequent processing activity is executed, wherein the browser management activity is selected from the group consisting of garbage collection, DNS prefetching, resource prefetching.

7. The method of claim 6, wherein the monitoring includes detecting when the browser requests the webpage and the executing includes preemptively executing a garbage collection management activity at the same time as page resources of the webpage are arriving so as to prevent the garbage collection management activity from adversely affecting execution of a script.

8. The method of claim 6, including:

creating a browser component dependency graph that includes data that is indicative of particular resources that are required to display the webpage; and creating a browser management dependency graph that includes data that is indicative of particular browser management activities.

9. The method of claim 6, wherein executing includes partially executing the at least one browser management activity so as to enable the activity of the at least one browser processing component to complete, and executing a remainder of the at least one browser management activity after the activity of the at least one browser processing component is complete.

10. The method of claim 6, wherein executing includes executing the at least one browser management activity using a separate thread than a thread that is utilized to execute the activity of the at least one browser processing component.

11. A computing device comprising:

a network interface comprising hardware that receives webpage data;

a display comprising hardware that displays a viewable portion of the webpage data;

means for monitoring, at the computing device, activity of at least one browser processing component of the browser, wherein the at least one browser processing component of the browser is associated with processing webpage data of a webpage, wherein the at least one browser processing component is selected from the group consisting of a scripting-language-based engine, a calculation and layout component, a painting component, a rendering component, a video decoding component, and an image decoding component; wherein the means for monitoring activity includes:
  means for storing data indicative of the activity of the at least one browser processing component of the browser to create an activity history for the at least one browser processing component of the browser; and
  means for monitoring real time activity of the at least one browser processing component of the browser;
means for predicting, at the computing device, based upon the monitoring, subsequent processing activity of the browser, wherein the subsequent processing activity is associated with processing the webpage data and the subsequent processing activity is selected from the group consisting of script execution, calculation and layout activity, painting, rendering, video decoding, and image decoding; wherein the means for predicting subsequent processing activity of the browser includes means for using the real time activity and the activity history for the at least one browser processing component to predict a timing of the subsequent processing activity; and
means for executing at least one browser management activity at the computing device based upon the subsequent processing activity so the at least one browser management activity occupies a different time period or different processor space than the subsequent processing activity to reduce a likelihood that the at least one browser management activity will adversely affect performance of the browser when the subsequent processing activity is executed, wherein the browser management activity is selected from the group consisting of garbage collection, DNS prefetching, resource prefetching.

12. The computing device of claim 11, wherein the means for monitoring activity includes means for detecting when the browser requests the webpage and the means for executing includes means for preemptively executing a garbage collection management activity while page resources of the webpage are arriving so as to prevent the garbage collection management activity from adversely affecting execution of a scripting-language-based object.

13. The computing device of claim 11, including:
  means for creating a browser component dependency graph that includes data that is indicative of particular resources that are required to display the webpage; and
  means for creating a browser management dependency graph that includes data that is indicative of particular browser management activities.

14. The computing device of claim 11, wherein the means for executing includes:
  means for partially executing the at least one browser management activity so as to enable the activity of the at least one browser processing component to complete, and means for executing a remainder of the at least one browser management activity after the activity of the at least one browser processing component is complete.

15. The computing device of claim 11, wherein the means for executing includes means for executing the at least one browser management activity using a separate thread than a thread that is utilized to execute the activity of the at least one browser processing component.

16. A non-transitory, tangible computer readable storage medium, encoded with processor readable instructions to perform a method for improving operation of a browser on a mobile device, the method comprising:
  monitoring, at the computing device, activity of at least one browser processing component of the browser, wherein the at least one browser processing component of the browser is associated with processing webpage data of a webpage, wherein the at least one browser processing component is selected from the group consisting of a scripting-language-based engine, a calculation and layout component, a painting component, a rendering component, a video decoding component, and an image decoding component; wherein the monitoring includes:
    storing data indicative of the activity of the at least one browser processing component of the browser to create an activity history for the at least one browser processing component of the browser; and
    monitoring real time activity of the at least one browser processing component of the browser;
  predicting, at the computing device, based upon the monitoring, subsequent processing activity of the browser, wherein the subsequent processing activity is associated with processing the webpage data and the subsequent processing activity is selected from the group consisting of script execution, calculation and layout activity, painting, rendering, video decoding, and image decoding wherein predicting subsequent processing activity of the browser includes using the real time activity and the activity history for the at least one browser processing component to predict a timing of the subsequent processing activity; and
  executing at least one browser management activity at the computing device based upon the subsequent processing activity so the at least one browser management activity occupies a different time period or different processor space than the subsequent processing activity to reduce a likelihood that the at least one browser management activity will adversely affect performance of the browser when the subsequent processing activity is executed, wherein the browser management activity is selected from the group consisting of garbage collection, DNS prefetching, resource prefetching.

17. The non-transitory, tangible computer readable storage medium of claim 16, wherein the monitoring includes detecting when the browser requests the webpage and the executing includes preemptively executing a garbage collection management activity while page resources of the webpage are arriving so as to prevent the garbage collection management activity from adversely affecting execution of a scripting-language-based object.

18. The non-transitory, tangible computer readable storage medium of claim 16, the method including:
  creating a browser component dependency graph that includes data that is indicative of particular resources that are required to display the webpage;
  creating a browser management dependency graph that includes data that is indicative of particular browser management activities.

19. The non-transitory, tangible computer readable storage medium of claim 16, wherein executing includes partially executing the at least one browser management activity so as to enable the activity of the at least one browser processing component to complete, and executing a remainder of the at least one browser management activity after the activity of the at least one browser processing component is complete.

20. The non-transitory, tangible computer readable storage medium of claim 16, wherein executing includes executing the at least one browser management activity using a separate thread than a thread that is utilized to execute the activity of the at least one browser processing component.

* * * * *